(12) United States Patent
Baker

(10) Patent No.: US 9,316,889 B2
(45) Date of Patent: Apr. 19, 2016

(54) FRONT PROJECTION EREADER SYSTEM

(71) Applicant: Nook Digital, LLC, New York, NY (US)

(72) Inventor: Philip G. Baker, Solano Beach, CA (US)

(73) Assignee: Nook Digital, LLC, New York, NY (US)

( * ) Notice: Subject to any disclaimer, the term of this patent is extended or adjusted under 35 U.S.C. 154(b) by 20 days.

(21) Appl. No.: 13/961,356

(22) Filed: Aug. 7, 2013

(65) Prior Publication Data

US 2014/0043516 A1 Feb. 13, 2014

Related U.S. Application Data

(60) Provisional application No. 61/680,513, filed on Aug. 7, 2012.

(51) Int. Cl.
G03B 21/20 (2006.01)
*G03B 21/14* (2006.01)
*G06F 1/16* (2006.01)
*H04N 5/74* (2006.01)

(52) U.S. Cl.
CPC .............. *G03B 21/14* (2013.01); *G06F 1/1645* (2013.01); *H04N 5/74* (2013.01)

(58) Field of Classification Search
CPC ....... G06F 3/0304; G06F 3/14; H04N 9/3194; G03B 21/14
See application file for complete search history.

(56) References Cited

U.S. PATENT DOCUMENTS

| 8,947,349 B1* | 2/2015 | Hart et al. ...................... 345/156 |
| 2008/0298083 A1* | 12/2008 | Watson ............. G02F 1/133615 362/603 |
| 2010/0289664 A1* | 11/2010 | Mizushima et al. ....... 340/691.6 |
| 2013/0207938 A1* | 8/2013 | Ryshtun et al. ............... 345/179 |

* cited by examiner

*Primary Examiner* — Sultan Chowdhury
*Assistant Examiner* — Danell L Owens
(74) *Attorney, Agent, or Firm* — Finch & Maloney PLLC

(57) ABSTRACT

Techniques are disclosed for purchasing, accessing, and/or providing electronic content by a projection based eReader. In accordance with one embodiment invention, a projector system is provided that is configured to engage a lighting socket and can be controlled by, for example, a remote control and/or imaged user input actions. Power to the system can be received through the socket based interface. The techniques can also be used in non-socketed configurations. The system is capable of creating large images suitable for reading large publications, such as newspapers or magazines, but can generally be used for any type of content including small print. In some embodiments, the system projects an image onto a lightweight, rigid screen that can be held by an individual that is situated in the area near the projection system.

20 Claims, 6 Drawing Sheets

# FRONT PROJECTION EREADER SYSTEM

RELATED APPLICATION

This application claims the benefit of U.S. Provisional Application No. 61/680,513, filed on Aug. 7, 2012, which is herein incorporated by reference in its entirety.

FIELD OF THE DISCLOSURE

This disclosure relates to electronic display devices, and more particularly, to display systems suitable for displaying large area content.

BACKGROUND

Electronic display devices such as tablets and eReaders are ideal for displaying content suitable for a display area ranging from about 6 to 10 inches. The content may be, for example, an e-book, an online article or blog, images, a movie or video, a map, just to name a few types. Such display devices are also useful for displaying a user interface that allows a user to interact with an application running on the device. The user interface may include, for example, one or more touchscreen controls and/or one or more displayed hardware feature labels that correspond to nearby hardware buttons. The display may be backlit or not, and may be implemented for instance with an LED screen or an electrophoretic display.

DETAILED DESCRIPTION

Figure 1:
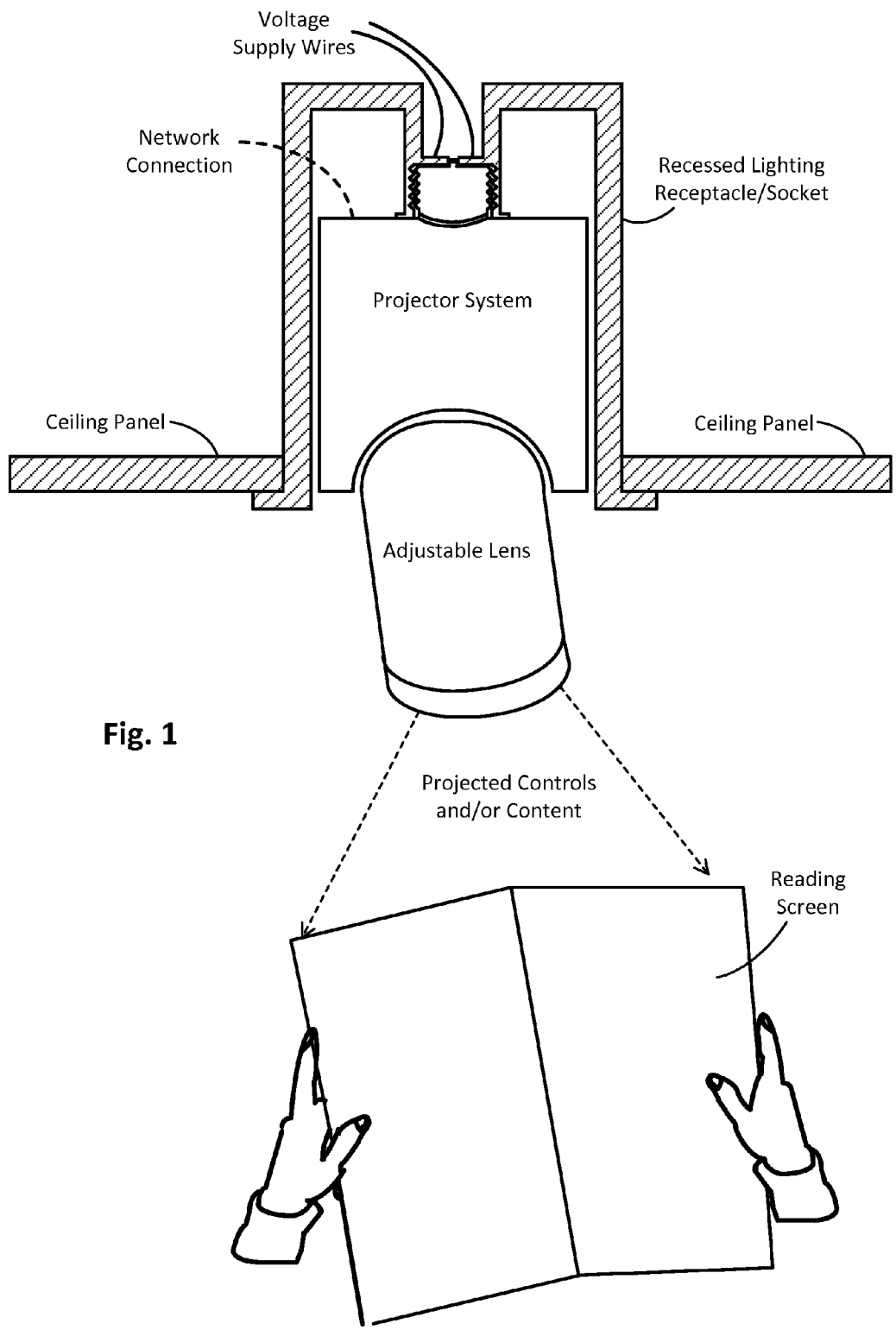
FIG. 1 illustrates a front projection eReader system configured in accordance with an embodiment of the present invention.

Techniques are disclosed for purchasing, accessing, consuming, and/or providing electronic content via a projection based eReader. In accordance with one embodiment invention, a projector system is provided that is configured to engage a light-bulb socket and can be controlled, for example, by a remote control. Power to the system can be received through the socket based interface. The techniques can also be used in non-socketed configurations. The system is capable of creating large images suitable for reading large publications, such as newspapers or magazines, but can generally be used for any type of content including small print. In some embodiments, the system projects an image onto a lightweight, rigid portable reading screen that can be held by an individual that is situated in the area near the projection system. The screen may be completely passive, semi-active, or active.

General Overview

As previously explained, electronic display devices such as tablets and eReaders are ideal for displaying user interfaces and content suitable for displays ranging from about 6 to 10 inches. However, some displayable content such as large format books, newspapers and illustrated trade and professional publications can be difficult or otherwise tedious to view on such relatively small screens. Unfortunately, making such display devices larger generally adds weight and increased cost, as well as increased power consumption (larger display uses more power) which in turn leads to diminished battery lives.

Thus, and in accordance with an embodiment of the present invention, a front projection eReader system is provided that has a similar shape and volume of a typical interior floodlight that fits into a recessed ceiling light fixture, for instance. The system screws into the same socket into which a light bulb may be screwed and can be controlled, for example, by a remote control. Power to the system can be received through the socket based interface. Note, however, that the system need not be limited to such socketed-based configurations. For instance, in other embodiments, the system can be implemented in a housing of any kind which can generally be deployed in or on a ceiling or wall or other suitable surface so that content can be provided via projection to a user situated nearby. The system is capable of creating large images suitable for reading large publications, such as newspapers or magazines, but can generally be used for any type of content including small print. The system projects an image onto a lightweight, rigid reading screen that can be held by an individual that is, for instance, sitting in a chair or otherwise situated in the area underneath or near the projection system. The reading screen is generally portable and may be completely passive or may include some active functionality, in accordance with various embodiments.

Such a system exploits the fact that many people read, for instance, at a favorite or otherwise preferred location in the home (such as the family room living room or the bedroom). Once the projection portion of the system is installed or otherwise deployed in a given location, its lensing can be adjusted to accommodate that preferred location. Such a system avoids or otherwise reduces the added weight that would be associated with a large tablet or other such typical eReader devices, as well as the increased power consumption associated therewith. The projected content may be in color, greyscale, or black and white, and may include small or large format publications, images or other such content (e.g., text, images, video, etc, or a combination thereof). In accordance with some embodiments, passive user control images may also be projected onto the screen and monitored by a camera, effectively allowing the user to interact with the system. In other embodiments, the user can interact with the system using a remote control and/or active controls configured on the screen.

In some embodiments, the system can be used in conjunction with a content server to serve content instantly within the home or office. The communication link between the server and the projection system can be wired and/or wireless. The server may be, for example, local to the user (e.g., home or office based computer system connected to a local area network) and may further be operatively coupled to the Internet so as to allow further access to publicly accessible content providers (both commercial and non-commercial). Alternatively, the service may include a remote server in a cloud-based arrangement. Such configurations allow a user access to virtually all available electronic content of all formats and sizes and at a location where it can easily, comfortably, and conveniently be consumed.

The projector lens of the system can be automatically and real-time adjusted so that it consistently projects a sharp image onto the reading screen. In one example case, virtual controls can also be projected onto the edges of the screen and finger motions by the user can be used to activate these virtual buttons. In one such specific case, a camera of the system detects the user has motioned over the projected virtual controls, thereby allowing for an appropriate system response to that user motion. Other embodiments may employ active controls that when activated cause a wireless transmission from the screen to the system. Still other embodiments may employ a combination of active and passive controls.

Various features and benefits of a system configured in accordance with an embodiment of the present invention will be apparent in light of this disclosure. For instance, some embodiments will allow for: the ability to read in a dark room without disturbing others; the ability to read large format content without the weight of a large eReader; and/or the ability to read more frequently because the system can be readily deployed in multiple rooms or areas, in a similar fashion to, for instance, a home music system (e.g., Sonos).

eReader System Architecture

FIG. 1 illustrates a front projection eReader system configured in accordance with an embodiment of the present invention. As can be seen, this example eReader system generally includes a projector system configured with an adjustable lens and a portable handheld reading screen. In this example embodiment, the projector system is mounted in a ceiling light fixture, such as a recessed can-type receptacle. Note, however, that the lighting fixture need not be recessed; rather, any lighting fixture can be used that allows the projector system to project content onto the screen at a desired user location as variously described herein. The dimension of the system housing can be set based on the type of can (or other lighting fixture) to be interfaced, if so desired. Thus, in some example embodiments, the system housing is configured to engage a 2-inch can, or a 4-inch can, or a 6-inch can. In other embodiments, the projector system may be engaged into a wall-mount fixture such as a sconce.

The projector system can receive the power provided at the socket and convert or otherwise condition that power as needed to drive the electronics of the eReader system. In one example embodiment, the system includes an AC to DC converter, along with filtering and one or more voltage regulators to provide the desired AC and/or DC supplies. The projector system may also be communicatively coupled to a network by, for example, a wireless (e.g., WiFi, Bluetooth, infrared, etc) and/or wired (e.g., Ethernet, fiber, etc) connection. Numerous power and network schemes will be apparent in light of this disclosure and the claimed invention is not intended to be limited to any particular such configurations.

In this example embodiment, a portion of the adjustable lens assembly protrudes from the ceiling, but in other embodiments it may be flush with the ceiling, and in some cases may be covered with a dome or other such cover that may or may not be part of the system optics. Numerous lensing arrangements will be apparent in light of this disclosure and the claimed invention is not intended to be limited to any particular such configurations.

In operation, once the projector system is deployed, the user can sit or otherwise get situated in a nearby desired location and power-on the system using, for example, a remote control or voice command. Alternatively, the system can be powered on and off using a light switch that corresponds to that particular outlet. Once powered on, the projector system can be programmed or otherwise configured to locate the rigid reading screen and to synchronize its coordinate system with that of the screen. The synchronization can be done passively (e.g., by imaging and identifying the corners or retroreflectors of the screen) or actively (e.g., by imaging IR energy emitting from an LED in each corner of the screen). To this end, the projector system may include or otherwise be operatively coupled with a camera for imaging the screen so as to provide synchronization/alignment data.

Once the projector system is synchronized with the screen, desired content can be requested and imaged onto the screen. Using on-board imaging or other suitable tracking scheme, the projector system can lock onto, track, and stay focused on the screen as the user makes small movements and/or moves the screen to the left, right, closer or farther way, such that the projected image will appear to be fixed on the screen. As will be appreciated, slight movement of the content on the screen may occur without disturbing the consumption process, and the projected image need not be perfectly fixed on the screen to be consumed.

The adjustable lens of the projector system can be adjusted for focus, tilt, zoom, x-y positioning, and keystoning and horizon adjustments, so that it projects a sharp image onto the screen being held or otherwise used by the user, in accordance with some embodiments. Likewise, the projector system can make adjustments to the adjustable lens such as magnification and aspect ratio based on whether the rigid reading screen is folded and whether the screen is in portrait or landscape mode. The screen can be held, for example, by the user like an unfolded newspaper or a large print book, or splayed open at a stand-up work bench.

In one example embodiment, virtual user controls (e.g., turn page, go back a page, go to Home page, go to Library, etc) can also be projected onto the edges of the reading screen (or other suitable screen location) and finger motions by the user can be used to activate these virtual buttons. In one such specific case, a camera of the system detects the user has motioned over the projected controls or otherwise indicated an intent to make a control action, thereby allowing for an appropriate system response to that user motion. As will be appreciated in light of this disclosure, note that such intent of the user can be inferred by a lingering of the user's finger(s) on a given one of the projected virtual control features, thereby allowing for distinction between an intended control action and a mere passing over or otherwise fleeting presence of the user's hand in a given control area. Other embodiments may employ active hardware controls that when activated cause a wireless transmission from the screen to the projector system, so as to cause a desired function to be carried out. A combination of active and passive controls may also be provisioned.

Another area for interaction between the projector system and the reading screen is to allow for user directed functions such as shopping, buying, searching, etc. Just as with other user controls, this can be accomplished actively by, for example, electronics in the screen such as one or more various hardware features operatively coupled to a wireless transmitter that communicates user selections/controls back to the projector system where they can be acted upon as needed. Alternatively, the user interaction can be accomplished passively by, for example, the user interacting with virtual buttons and other controls projected on the screen, with a camera of the system detecting the virtual button engagement.

Projector System

Figure 2A:
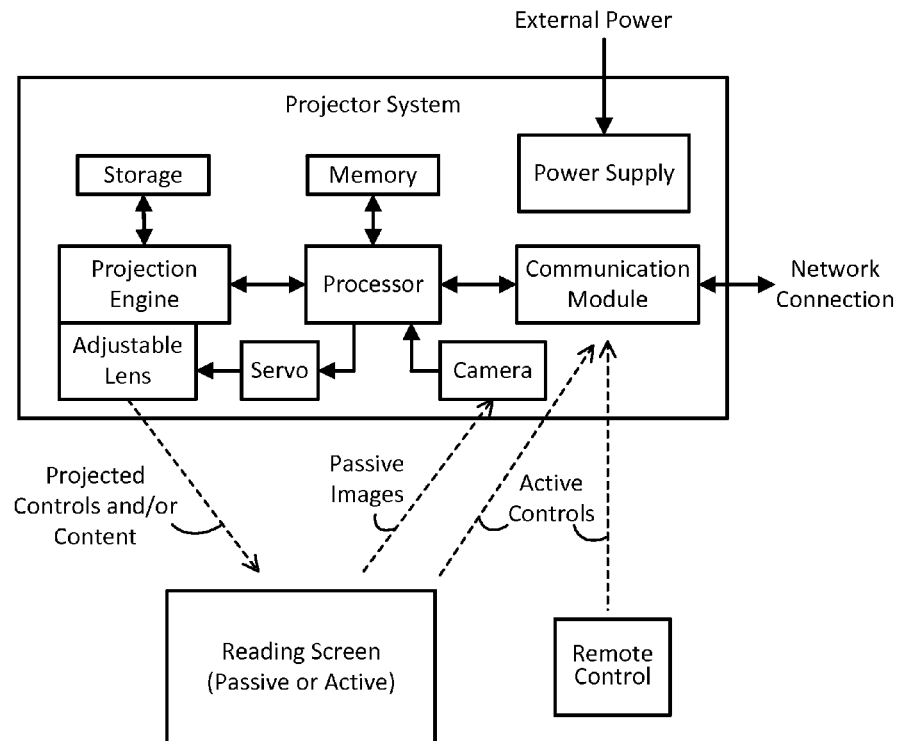
FIG. 2a is a block diagram of a front projection eReader system configured in accordance with an embodiment of the present invention.

FIG. 2a is a block diagram of a front projection eReader system configured in accordance with an embodiment of the present invention. As can be seen, the projector system includes a camera, a communication module, a processor and memory, and a projection engine operatively coupled to a storage as well as an adjustable lens which is in turn operatively coupled to a servo. In addition, a power supply module receives external power and conditions it as needed to supply power to the various components of the system. As can be further seen, a rigid reading screen that can be active or passive receives projected controls and/or content from the system, and also passively allows for images capturing user control gestures back to the camera of the system and/or actively allows for communication signals back to the communication module of the system. A remote control also actively and provides communications back to the communication module. Other typical componentry and functionality not reflected in the block diagram will be apparent, such as communication busses, co-processors, image processing modules, operating system, etc.

The projection engine and adjustable lens/servo assembly generally includes an optical projection engine with illumination, optics, servos/actuators, and other componentry necessary to project sharp images, such as a TI Digital Light Projection (DLP) system by Texas Instruments. Any suitable imaging and lensing arrangement that allows for dynamic adjustment to keep content reasonably presented on the screen can be used.

The camera can be, for example, an infrared (IR) camera or any suitable camera capable of imaging the reading screen in typical reading scenarios, so as to capture user control gestures. In some embodiments, there may be a set of established control gestures to facilitate command interpretation by the system after such gestures have been passively captured via the camera and communicated to the communication module and ultimately the processor. An example control gesture in accordance with one example embodiment is an extended finger (or multiple fingers) held down onto a virtual control feature of the screen for 2 seconds or more. In some embodiments, the dwell time of a gesture may be user-configurable, as may be the number of fingers that correspond to a given desired function (e.g., one extended finger pointing to the right means turn one page forward, two extended fingers pointing to the right means turn two pages forward, etc; one extended finger pointing to the left means turn one page backward, two extended fingers pointing to the left means turn two pages backward, etc). In some embodiments, the camera is integrated with the projection engine. Alternatively, each of the projection engine and camera can be implemented as discrete components.

The communication module can be, for example, a Wi-Fi, Bluetooth, and/or IR based wireless communication module that can receive wireless communications from the reading screen and/or remote control. As can be further seen, the communication module may be configured to provide access to a local and/or wide area network (e.g., home network, company network, and/or Internet), such as via an Ethernet or USB connection. Thus, content may be received from some remote source (e.g., content provider or online repository, depending on the application of the device) via the communication module and then presented to the user. In one specific example embodiment, the communication module comprises any suitable 802.11b/g/n WLAN chip or chip set commonly used in mobile computing devices.

In this example embodiment, the memory may include any number of modules stored therein that can be accessed and executed by the processor (and/or a co-processor). As can be seen in the example embodiment of FIG. 2b, the modules included in the software architecture may include an operating system and user interface (OS/UI), imaging recognition and processing module (e.g., command interpretation and screen tracking), servo-adjust module, a projection engine module, a projector-screen synchronization/alignment module, a search/shop module, and a user controls processing module, just to name and show a few examples. Other embodiments may include fewer or more modules, and the degree of modularity may vary from one case to the next, with the overall functionality being as variously described herein. The modules can be implemented, for example, in any suitable programming language (e.g., C, C++, objective C, JavaScript, custom or proprietary instruction sets, etc), and encoded on one or more non-transient machine readable mediums, that when executed by the processor (and/or any co-processor), carries out the functionality of the system as variously described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the system functionality. In short, the functional modules can be implemented in hardware, software, firmware, or a combination thereof.

Figure 2B:
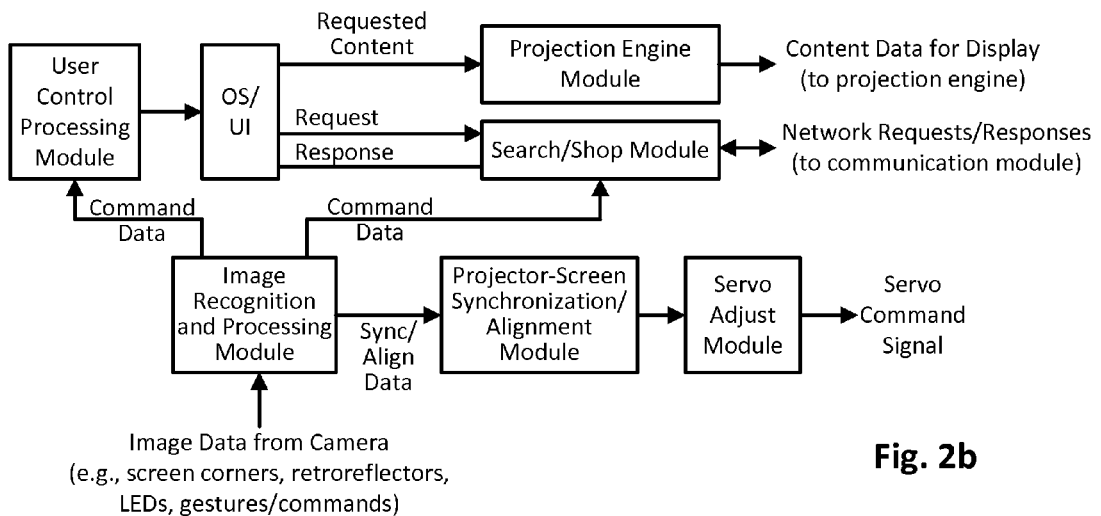
FIG. 2b is a block diagram of software architecture including in the front projection eReader system shown in FIG. 2a, configured in accordance with an embodiment of the present invention.

The processor can be any suitable processor, and may include one or more co-processors or controllers to assist in system control and image processing. In one example case, the processor may receive input from the user, including input from or otherwise derived from the remote control buttons via the communication module and/or input based on user interactions with actual control buttons of the reading screen (assuming active screen controls) and/or input based on imaging of user control gestures or user interactions with virtual control buttons of the reading screen captured via the camera (assuming passive screen controls). The processor can then direct or otherwise cause appropriate action to be taken in response to the user control. An example input (or command) would be a power-on signal, which in one example case could in-turn cause the processor to call the projector-screen synchronization/alignment module. In one such embodiment, the projector-screen synchronization/alignment module can execute or otherwise initiate an alignment procedure between the screen and projector system so that the controls and/or content are suitably imaged on the screen. As shown in FIG. 2b, this routine may involve, for example, using the camera to locate the various reading screen identifiers (e.g., corners, retroreflectors, LEDs, or other screen discovery/tracking features), and then direct the servo via the servo adjust module to drive the servo to move the adjustable lens to project on that location. This may involve, for example, the execution of the imaging recognition and processing module to identify reading screen corners within images captured by the camera, in some embodiments. In some such cases, the corners may be identified based on their shape and relationship with respect to one another (e.g., spacing). The servo-adjust module can be used to translate the coordinates of the identified screen location to a servo command signal that will point the lens assembly to that location. Once the projector system and reading screen are aligned/synchronized with each other, the projection engine module can be executed to provide requested content in an appropriate format to the projection engine, which in turn projects that content onto the screen via the adjustable lens assembly. As the user moves or shifts the handheld rigid reading screen, synchronization/alignment module may continue to execute so as to maintain the synchronization/alignment. In other embodiments, note that the screen can be fixed to or otherwise resting on a given position (such as in the case of a standing desk or other generally fixed configuration), so that the screen need not be continuously tracked or monitored in real-time; rather, only an initial alignment is carried out which generally then remains accurate for the given reading/consumption session or until the reading screen is moved and the synchronization/alignment routine is called again so as to allow for discovery of the new screen position. A search/shop module may be called by the processor based on a user selection of a search/shop button on the remote control or other captured command data interpreted by the imaging recognition and processing module. Various other user control processing routines and other functional modules will be apparent in light of this disclosure. For instance, another example user-based command detectable by the imaging recognition and processing module would be turn-page (next page, previous page, or other specific page #), which in one example case would in-turn call the projection engine module to provide the requested page content to the projection engine for imaging onto the screen. In the example embodiment shown in FIG. 2b, the imaging recognition and processing module interprets the command and provides the command data to the user control processing module, which then issues a corresponding command to the OS/UI which issues a content request via the search/shop module and receives a response including the requested content. The OS/UI that calls the projection engine module to provide the requested page content to the projection engine for imaging onto the rigid reading screen.

The memory can be any suitable type of memory and size (e.g., 512 Mbytes or 4 Gbytes of SDRAM), and in some embodiments may be implemented with non-volatile memory or a combination of non-volatile and volatile memory technologies. The storage can also be implemented with any suitable memory and size (e.g., 50 GBytes of flash memory).

As previously explained, the form factor of the projector system may be, for example, that of a flood lamp type light bulb. However, any number of suitable form factors can be used, depending on the target application. The projector portion of the system may be, for example, stored in a metallic box or other suitable housing that can be bracketed to a ceiling tile or framework or wall, or that simply rests on a given surface. In still other embodiments, the projector portion can be incorporated into a desk lamp, floor lamp or a table lamp. Numerous applications in addition to casual reading will be apparent in light of this disclosure. For instance, the projector portion can be incorporated in a kitchen with the image projected onto the counter or other surface for use during cooking. In other cases, the projector portion can be incorporated into an office, library, or dorm room with the image projected onto a desktop or other surface for use during work/study-time.

The reading screen can be, for example, a lightweight handheld rigid screen onto which the projected content can be imaged. In some cases, the screen is implemented, for instance, with a matte finish vinyl (e.g., white or pale yellow or other suitable reading surface color), although any number of suitable materials can be used. The screen may be passive and not require any power source, or may be active (e.g., configured with a battery or other power source such as photovoltaic cells) or at least semi-active (e.g., configured to actively harvest power sufficient to provide a degree of active sensing). Example passive and active screens will be discussed in turn. The rigid reading screen may have one or more folds (vertical and/or horizontal) that effectively allow the screen size to be adjusted by the user as desired.

Passive Reading Screen

Figure 3:
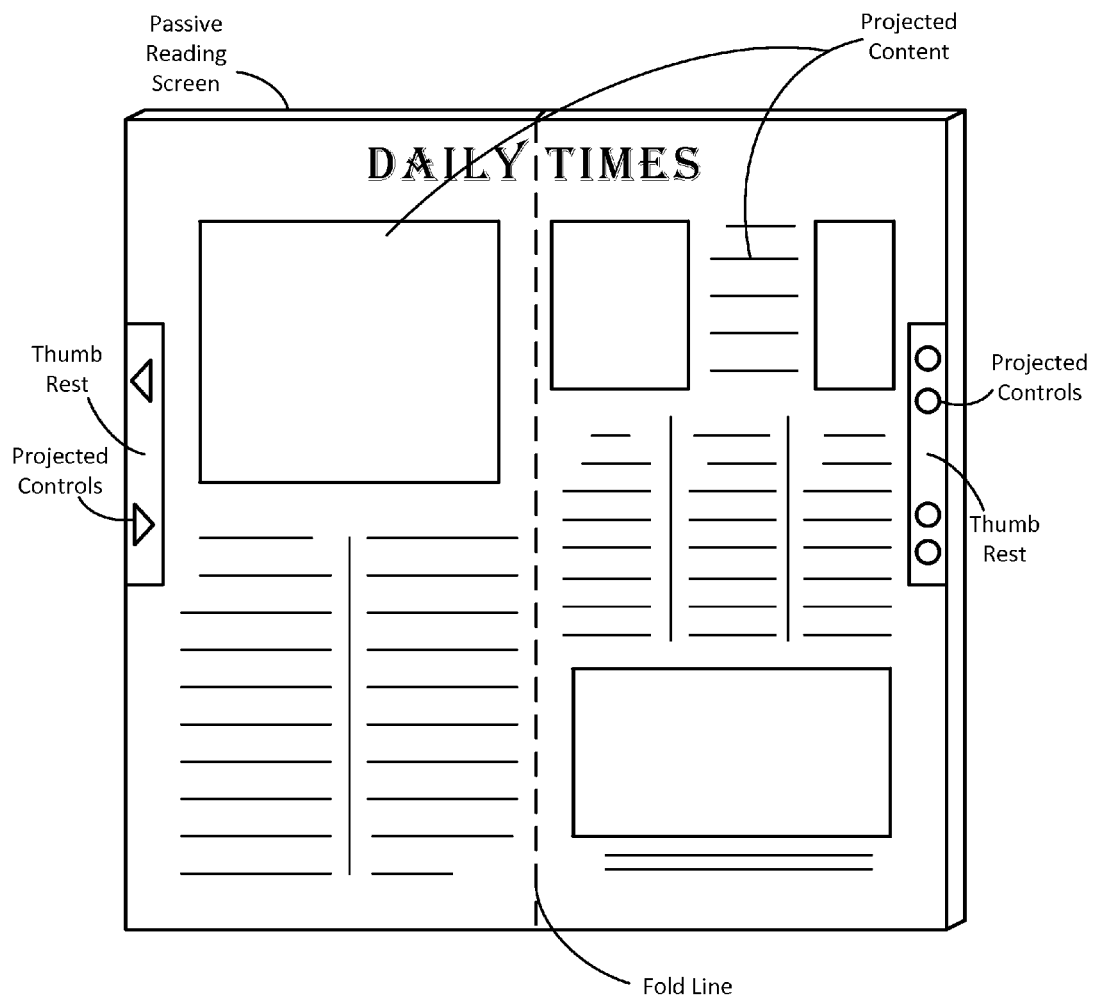
FIG. 3 illustrates a passive reading screen that can be used in a front projection eReader system configured in accordance with an embodiment of the present invention.

FIG. 3 illustrates an example reading screen that can be used in a front projection eReader system configured in accordance with an embodiment of the present invention. As can be seen, the screen is passive and includes a number of projected controls on each side, and a fold line which happens to be in the vertical position. Note, however, that the rigid screen can also be used with the fold line in the horizontal position, depending on how the user holds the screen. Further note that the passive or virtual controls may also be painted or otherwise fixed on the surface of the screen (rather than imaged onto the screen).

In operation, the camera of the projection system continuously monitors the screen so as to maintain alignment therewith and to keep the projected controls and/or content on the screen. This alignment process can be accomplished by imaging and detecting unique features of the screen, such as its corners as previously explained. Other embodiments may detect other features, such as the reflectivity of the screen, or the color of the screen. Any number of features that can be passively detected so as to allow for projector-screen alignment can be used. As will be appreciated, as used herein, passively means that the screen does not require power to carry out the projector-screen alignment process.

The rigid reading screen configuration (dimension, foldable, not foldable, etc) can vary from one embodiment to the next. In some cases, the screen may be foldable along the fold line, and the projected image can be adjusted based on whether the screen is in full-size mode (unfolded) or half-size mode (folded). In a similar fashion, the projected image can be adjusted based on whether the screen is in landscape mode (e.g., horizontal fold line) or portrait (e.g., vertical fold line). In one specific embodiment, the screen is a foldable handheld screen that is generally portable by the user and can be easily deployed by the user.

As previously explained, the passive screen still allows for a degree of interaction with the projector so as to control functions such as reading (e.g., page turns, word look-up, etc), shopping, buying, searching, etc. This can be accomplished by the user interacting with virtual controls projected on to or otherwise provisioned on the screen, wherein the camera and a corresponding image routine is configured to detect a finger touching or other user contact of the virtual controls. Then the processor of the system can take or direct appropriate action.

Figure 4:
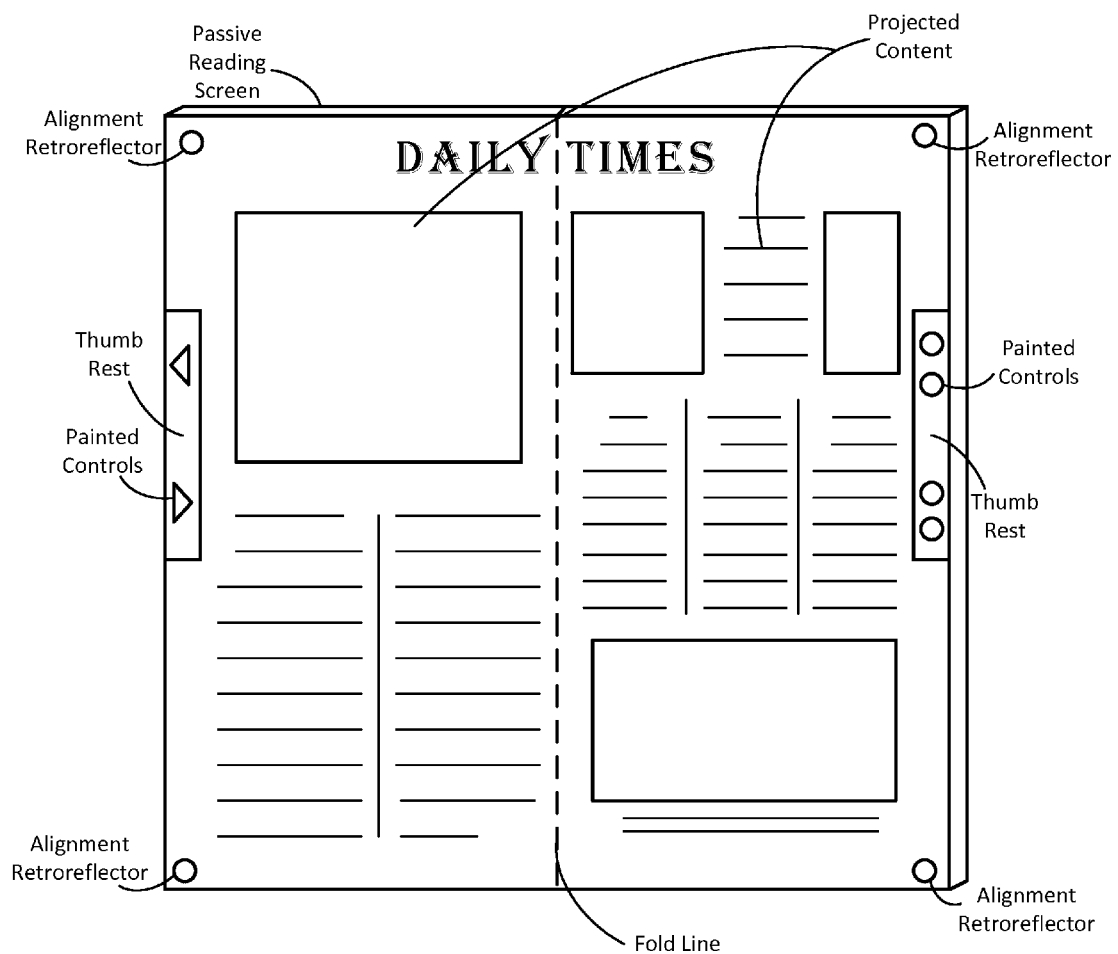
FIG. 4 illustrates a passive reading screen that can be used in a front projection eReader system configured in accordance with another embodiment of the present invention.

FIG. 4 illustrates a passive reading screen that can be used in a front projection eReader system configured in accordance with another embodiment of the present invention. This embodiment is similar to the one shown in FIG. 3, except that it includes painted user controls (rather than projected) and further includes alignment retroreflectors to assist in the projector-screen synchronization/alignment process. As is generally known, a retroreflector returns light (e.g., IR or other energy) in the direction it came from, such as a corner cube. Thus, in one such embodiment, the projector system can be programmed or otherwise configured to scan a light beam (e.g., laser) using the servo and adjustable lens assembly until the camera (e.g., IR camera) detects reflections of that energy. Once initial detection is made, the precise position of the screen can be identified and tracked accordingly so that imaging of content onto the screen may commence and be maintained. The scan routine can be configured, for instance, to scan a 5 ft to 10 ft square area in the camera's field of view.

Active Display

Figure 5:
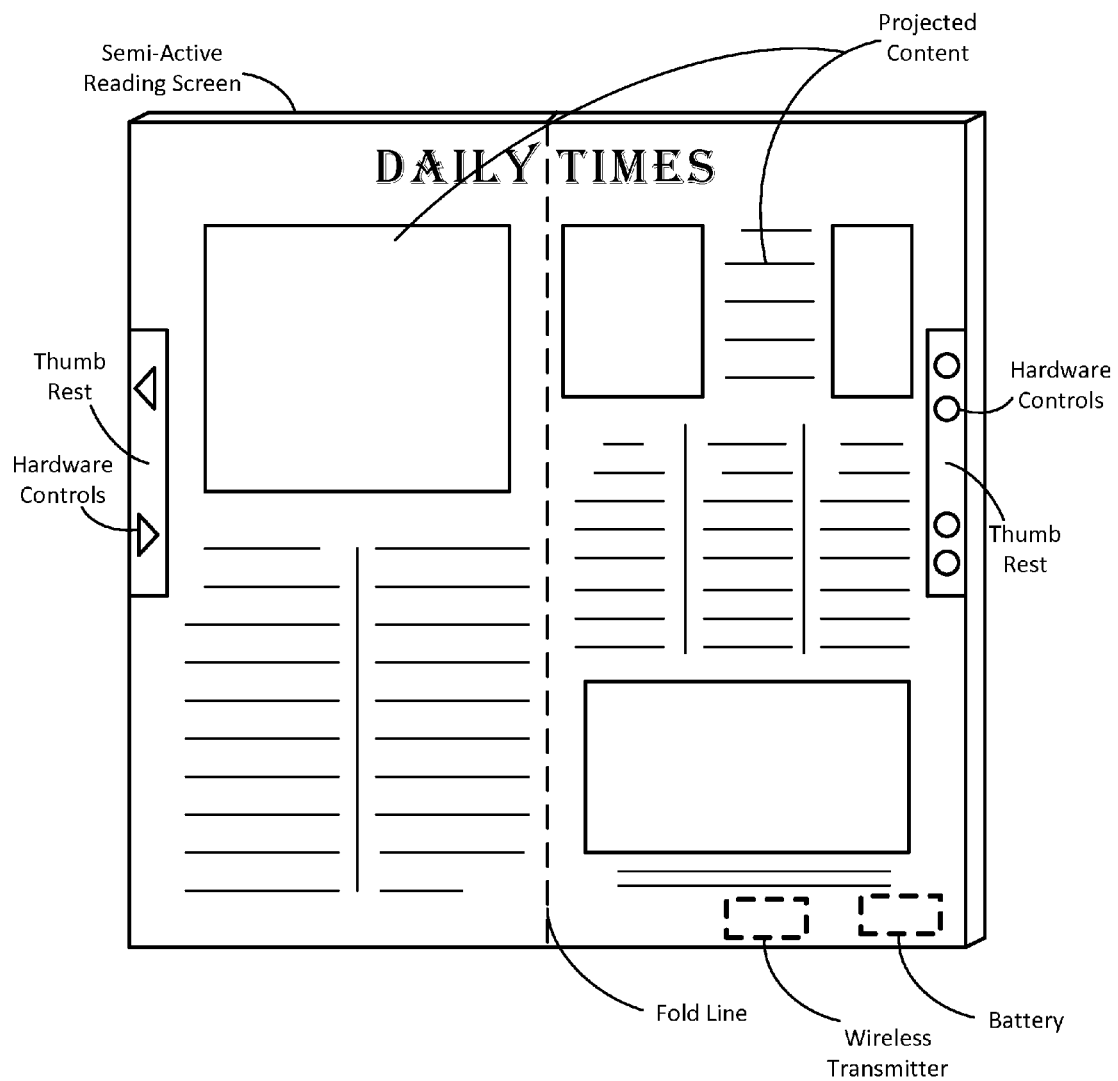
FIG. 5 illustrates a semi-active reading screen that can be used in a front projection eReader system configured in accordance with an embodiment of the present invention.

FIG. 5 illustrates a semi-active reading screen that can be used in a front projection eReader system configured in accordance with an embodiment of the present invention. This embodiment is similar to the one shown in FIG. 3, except that it includes hardware user controls (rather than projected or painted) and further includes some active componentry such as a wireless transmitter that is powered by a battery. In this example case, the hardware controls can be engaged by the user, which in turn cause the wireless transmitter to emit a control request to the communication module of the projector system. The control functions can be, for example, with respect to reading (e.g., page turns, word look-up, etc), shopping (e.g., go to content provider website to browse new book releases, buying, searching (e.g., go to local collection to find a previously purchased book or content), etc.

The battery can be, for example, a lithium ion battery, although any suitable battery technology or alternative power source (e.g., photovoltaic cells) can be used. Alternatively, a power scavenging circuit can be used, assuming that sufficient power can be provided to run the wireless transmitter. In still other embodiments, a combination of battery, solar, and/or scavenged power can be used. The transmitter module can be, for example, configured to match the protocol(s) of the communication module of the projector system.

Figure 6:
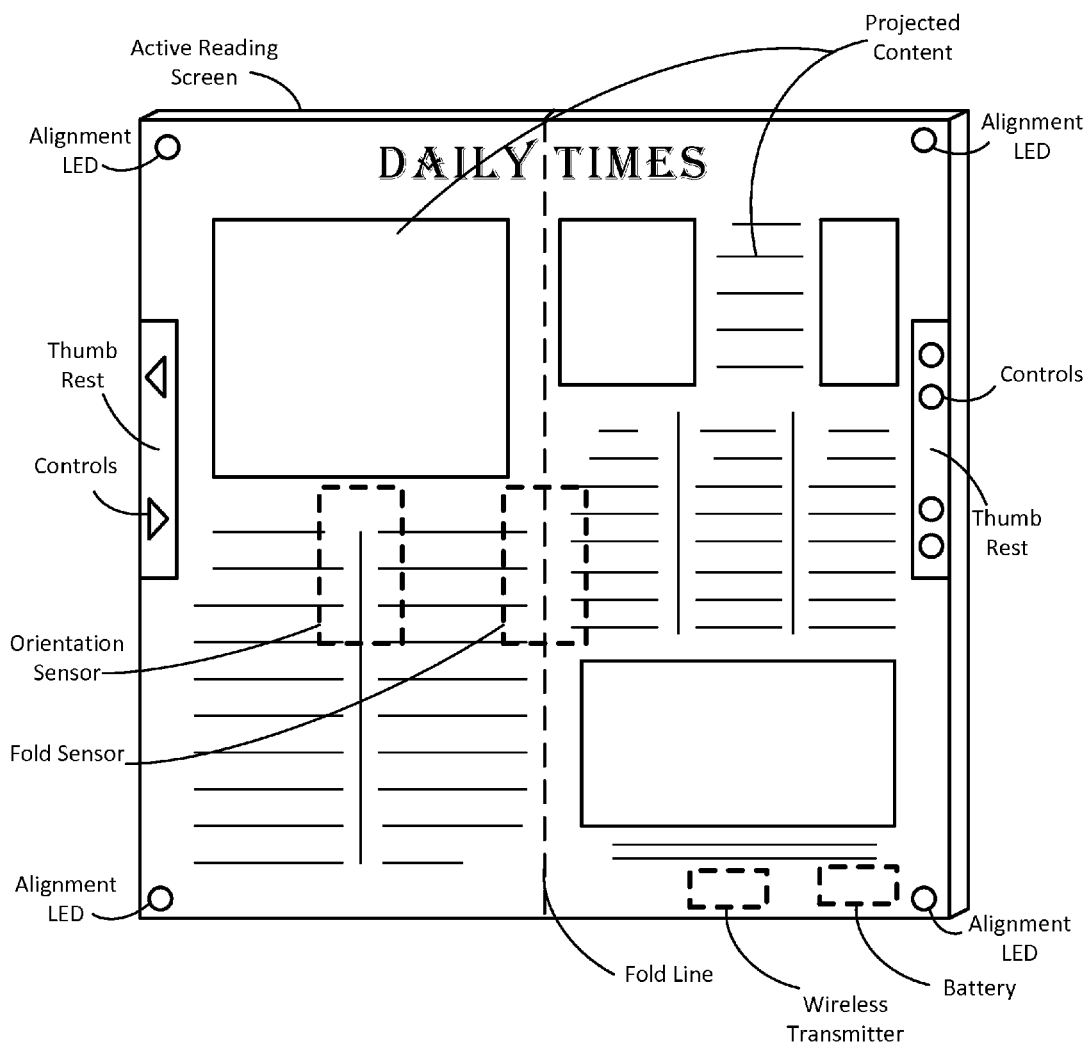
FIG. 6 illustrates an active reading screen that can be used in a front projection eReader system configured in accordance with an embodiment of the present invention.

FIG. 6 illustrates an active reading screen that can be used in a front projection eReader system configured in accordance with an embodiment of the present invention. This embodiment is similar to the one shown in FIG. 5, except that it includes controls that may be projected or painted or hardware based and further includes a number of alignment LEDs (four shown in this example embodiment), as well as an orientation sensor (e.g., for detecting landscape or portrait mode) and a fold sensor (e.g., for detecting fold mode or unfolded mode, or otherwise indicating the fold status of the screen).

Much like the passive and semi-active reading screens, the active screen has the ability to effectively interact with the remote projector in order to control reading functions and to insure the image fills the screen and stays congruent with the screen. For example, if the reader shifts in his chair and moves the display several inches lateral to the projected content, the image moves with the active screen, based on feedback from the alignment LEDs. Sensors in a forward facing camera in the projector interpret the movement based on the emitted LED energy, which in turn causes the processor to command the projector and/or lens assembly to optically and/or mechanically adjust the position and magnification of the image. As previously explained, the active screen and projector can be connected wirelessly by, for example, IR, WiFi, Bluetooth, or other suitable wireless protocol, to perform such optical adjustments, as well as to control operation of the eReader system.

Another typical operation in accordance with an embodiment of the present invention is for the user to sit in his chair, turn on the projector by touching a button on the active screen. Once comfortable in his/her chair, the user can touch or otherwise activate a button to begin reading. The servo-motor in the projector system can then be commanded to move the lensing to align the image on the active screen. Other buttons allow the user to, for instance, select a book and perform other functions. As the user moves, the projector makes small adjustments to position the image properly. Another feature shown in the example embodiment of FIG. 6 is the fold sensor. In general, the active screen can be folded in half for smaller books or a single newspaper page, for instance. When that occurs, the fold sensor generates a signal which is then sent via the wireless transmitter to the projector to change the magnification. In a similar fashion, the active screen can be turned so as to provide a portrait mode (or landscape mode). When a change from one mode to the other occurs, the orientation sensor generates a signal which is then sent via the wireless transmitter to the projector to change the magnification and otherwise adapt the image to best fit the active screen.

In some embodiments, the system can be used in conjunction with a content server (such as that described in co-pending application Ser. No. 13/961,365 filed on Aug. 7, 2013 and titled "Electronic Bookshelf System" to serve requested content within the home or office. This application is herein incorporated by reference in its entirety. The content from that server (or servers) can be retrieved to the projector system and stored, for example, in the local storage of the projection system for future viewing. Alternatively, that content could be streamed for live viewing, if so desired.

Numerous variations and embodiments will be apparent in light of this disclosure. For instance, one example embodiment provides an eReader device. The device includes a projector system having an adjustable lens configured to project digital content onto a user's portable rigid reading screen, a camera for imaging the reading screen, and an alignment mechanism configured to adjust the adjustable lens based on reading screen image data captured by the camera so that the digital content is projected onto the reading screen for consumption by the user. In some cases, the device includes the portable reading screen. In some such cases, the reading screen includes one or more fold lines. In other such cases, the reading screen is an active reading screen configured to transmit communications to the projector system. In some such cases, the communications comprise at least one of user input or sensor data. In other such cases, the active reading screen includes one or more light emitting diodes and/or retroreflectors detectable by the camera and for use in aligning the projector system so that the projected digital content is continuously displayed on the reading screen. In still other cases that include the reading screen, the screen is a passive reading screen. In some cases, the projector system is configured to project one or more virtual control features onto the reading screen. In some cases, the projector system is configured to interpret user interaction with one or more virtual control features depicted on the reading screen based on images captured by the camera. In some cases, the projector system includes a communication module configured to wirelessly receive user input based on user interaction with at least one of a remote control that is separate from the reading screen and/or one or more virtual and/or actual control features of the reading screen. In some example cases, the device is configured to engage in at least one of a light-bulb socket and/or a recessed lighting socket. In some example cases, the alignment mechanism comprises: an image recognition and processing module configured to receive image data from the camera, and to output corresponding screen alignment data captured in the image data; a projector-screen alignment module configured to determine a location of the reading screen based on the screen alignment data; and a servo adjust module configured to direct a servo to move the adjustable lens to project on the reading screen location. In some example cases, the projector system includes an image recognition and processing module configured to receive image data from the camera, and to output corresponding command data captured in the image data, and a user control processing module configured to issue commands based on the command data. In some example cases, the projector system includes a search module configured to process network requests and corresponding responses, including user requests for content from a remote location, and a communication module for interfacing with a communication network.

Another embodiment of the present invention provides an eReader projection system. The system includes a rigid handheld portable reading screen, a projector having an adjustable lens configured to project digital content onto the portable reading screen, a camera for imaging the reading screen, and a servo configured to move the adjustable lens to project on the reading screen based on reading screen location data captured by the camera. In some cases, the reading screen is an active reading screen configured to transmit communications to the projector, the communications including at least one of: sensor data indicating orientation and/or fold status of the screen; and/or user input derived from one or more virtual and/or actual control features of the reading screen. In some cases, the reading screen is a passive reading screen, and the projector is further configured to project one or more virtual control features onto the reading screen and to interpret user interaction with one or more virtual control features depicted on the reading screen based on images captured by the camera. In some cases, the system includes a communication module configured to wirelessly receive user input based on user interaction with at least one of: a remote control that is separate from the reading screen; one or more virtual control features of the reading screen; and/or one or more actual control features of the reading screen.

Another embodiment of the present invention provides an eReader projection system. The system includes a projector having an adjustable lens configured to project digital content onto a rigid handheld portable reading screen, a camera for imaging the reading screen, and a servo configured to move the adjustable lens to project on the reading screen, based on reading screen location data captured by the camera. The system is configured to engage in at least one of a light-bulb socket and/or a recessed lighting socket. In one example such case, the system further includes the rigid handheld portable reading screen.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. An eReader device, comprising:
a communication module configured to wirelessly receive sensor data from a user's portable rigid reading screen, the sensor data indicative of at least one of orientation of the reading screen and fold status of the screen;
a projector system having an adjustable lens configured to project digital content onto the reading screen;
a camera for imaging the reading screen; and
an alignment mechanism configured to adjust the adjustable lens based on reading screen image data captured by the camera and the sensor data, so that the digital content is projected onto the reading screen for consumption by the user.

2. The device of claim 1 further comprising the portable reading screen.

3. The device of claim 2 wherein the reading screen includes one or more fold sensors for sensing whether the reading screen is in a fold mode or an unfolded mode, and one or more orientation sensors for sensing whether the reading screen is in portrait or landscape mode.

4. The device of claim 2 wherein the reading screen is configured to transmit communications to the projector system, including signals representative of the sensor data.

5. The device of claim 4 wherein the communications further comprise user input.

6. The device of claim 4 wherein the reading screen includes one or more light emitting diodes detectable by the camera and for use in aligning the projector system so that the projected digital content is continuously displayed on the reading screen.

7. The device of claim 2 wherein the reading screen comprises at least one of a battery, a photovoltaic cell, and power scavenging circuitry.

8. The device of claim 1 wherein the projector system is configured to project one or more virtual control features onto the reading screen.

9. The device of claim 1 wherein the projector system is configured to interpret user interaction with one or more virtual control features depicted on the reading screen based on images captured by the camera.

10. The device of claim 1 wherein the communication module is further configured to wirelessly receive user input based on user interaction with at least one of a remote control that is separate from the reading screen and one or more virtual and/or actual control features of the reading screen.

11. The device of claim 1 wherein the device is configured to engage in at least one of a light-bulb socket and a recessed lighting socket.

12. The device of claim 1 wherein the alignment mechanism comprises:
an image recognition and processing module configured to receive image data from the camera and sensor data, and to output corresponding screen alignment data captured in the image data and sensor data;
a projector-screen alignment module configured to determine a location of the reading screen based on the screen alignment data; and
a servo adjust module configured to direct a servo to move the adjustable lens to project on the reading screen location, wherein at least one of magnification and aspect ratio of the adjustable lens is adjusted based on whether the reading screen is folded and whether the screen is in portrait or landscape mode.

13. The device of claim 1 further comprising:
an image recognition and processing module configured to receive image data from the camera, and to output corresponding command data captured in the image data; and
a user control processing module configured to issue commands based on the command data.

14. The device of claim 1 wherein the communication module is further configured for interfacing with a wide area communication network, the device further comprising:
a search module configured to process network requests and corresponding responses, including user requests for content from a remote location.

15. An eReader projection system, comprising:
a rigid handheld portable reading screen configured with at least one of a fold sensor and an orientation sensor;
a projector having an adjustable lens configured to project digital content onto the portable reading screen;
a camera for imaging the reading screen, so as to provide reading screen location data; and
a servo configured to move the adjustable lens to project on the reading screen, based on the reading screen location data captured by the camera;

wherein the reading screen is further configured to wirelessly transmit communications to the projector, the communications including at least one of:
  sensor data indicating at least one of orientation and fold status of the screen, wherein at least one of magnification and aspect ratio of the adjustable lens is adjusted based on whether the reading screen is folded and whether the screen is in portrait or landscape mode; and
  user input derived from at least one of virtual and actual control features of the reading screen.

16. The system of claim 15 wherein the reading screen a is further configured with a plurality of light emitting diodes (LEDs), and the reading screen location data is based at least in part on energy emitted from the LEDs that is captured by the camera.

17. The system of claim 15 wherein the projector is further configured to project one or more virtual control features onto the reading screen and to interpret user interaction with one or more virtual control features depicted on the reading screen based on images captured by the camera.

18. The system of claim 15 further comprising a communication module configured to wirelessly receive user input based on user interaction with at least one of a remote control that is separate from the reading screen and one or more power-consuming control features of the reading screen.

19. An eReader projection system, comprising:
  a projector having an adjustable lens configured to project digital content onto a rigid handheld portable reading screen;
  a camera for imaging the reading screen; and
  a servo configured to move the adjustable lens to project on the reading screen, based on reading screen location data captured by the camera, and sensor data wirelessly received from the reading screen and indicative of at least one of fold status of the screen and orientation of the screen;
  wherein the system is configured to engage in at least one of a light-bulb socket and a recessed lighting socket.

20. The system of claim 19 further comprising the rigid handheld portable reading screen, the screen comprising at least one of:
  a fold sensor for sensing whether the reading screen is in a fold mode or an unfolded mode;
  orientation sensor for sensing whether the reading screen is in portrait or landscape mode; and
  one or more light emitting diodes detectable by the camera and for use in aligning the projector system so that the projected digital content is continuously displayed on the reading screen.

* * * * *